March 29, 1966 W. P. ASTEN 3,243,737

REED FREQUENCY SUPPRESSION BY USE OF SIGNAL CANCELLATION IN ELECTROMECHANICAL FILTERS WHICH PASS THE FORK FREQUENCY

Filed June 9, 1964

INVENTOR

WILLIAM P. ASTEN

BY Hurvitz & Rose

ATTORNEYS

United States Patent Office 3,243,737

Patented Mar. 29, 1966

3,243,737

REED FREQUENCY SUPPRESSION BY USE OF SIGNAL CANCELLATION IN ELECTRO-MECHANICAL FILTERS WHICH PASS THE FORK FREQUENCY

William P. Asten, Aldie, Va., assignor to Melpar, Inc., Falls Church, Va., a corporation of Delaware Filed June 9, 1964, Ser. No. 373,766
12 Claims. (Cl. 333—71)

The present invention relates generally to tuning fork filters and more particularly to a tuning fork filter employing an impedance connected in series with the drive and output transducers, which impedance is arranged for suppressing reed frequency response.

It is known that a tuning fork assembly has two dominant oscillation modes, namely reed and fork. When the assembly is excited so it oscillates as a fork, the fork tines move at any instant of time, in equal and opposite amounts relative to a center line between them. In contrast, reed excitation results in movement of the tines in the same direction relative to the center line.

The figure of merit, or Q, of the fork assembly when it oscillates as a fork is substantially greater than for reed oscillations. In consequence, amplitude response of the assembly to signals at the fork frequency is considerably greater than to those at the reed frequency, on the order of 10 to 20 db. Despite the divergence in responses at these two frequencies, considerable reed frequency energy is coupled through the fork assembly when it is utilized as a bandpass or notch filter. Of course, this cannot be tolerated in filter applications where the selectivity of a tuning fork is required, i.e., where attenuation of frequencies outside the filter bandpass is designed to be on the order of 40 db. Because tuning fork assemblies have this substantial reed frequency response, they have not been generally utilized for modern bandpass filters, despite their recent resurgence as oscillator frequency standards.

Modern sheet metal tine tuning fork assemblies are usually designed so the reed and fork frequencies are anharmonically related. This is necessary so that the tines will always vibrate coherently as a fork, when excited at the fork frequency; otherwise the assembly may oscillate either as a fork or a reed when excited at the fork frequency. Because of the necessary anharmonic relationship, the reed frequency response cannot be cancelled by properly designing the fork assembly so the fork and reed frequencies coincide.

According to the present invention, suppression of the reed frequency response is attained simply by connecting a capacitor between the tuning fork input and output transducers. The capacitor supplies signal from the input source to the output transducer with such a phase that reed frequency energy supplied by the fork tines to the output transducer is effectively cancelled. When the assembly is excited to the fork frequency, the signal coupled through the capacitor adds to the energy supplied to the output transducer by the tines. Addition occurs in one instance and subtraction in the other because relative movement of the input and output lines under the two circumstances is displaced by 180°.

I have found that a capacitor is the most effective impedance for cancelling the reed frequency response because it causes a phase advance of the voltage applied to the output transducer. This phase advance compensates for the delay or phase lag introduced by the fork as it mechanically transfers energy from the input to the output tine during oscillation and the further delay introduced in transferring energy between the fork and its drive and pickup transducers. It has been found that for each assembly a particular value of capacity introduces a phase advance such that reed response is almost completely attenuated.

It is, accordingly, an object of the present invention to provide a new and improved tuning fork filter wherein reed frequency response is virtually suppressed.

Another object of the invention is to provide a new and improved tuning fork filter having a substantial response only at the fork frequency.

A further object of the invention is to provide a tuning fork filter in which a single capacitor is utilized for substantially suppressing reed frequency response of the tuning fork assembly.

The above and still further objects, features and advantages of the present invention will become apparent upon consideration of the following detailed description of one specific embodiment thereof, especially when taken in conjunction with the accompanying drawings, wherein.

Figure 1:
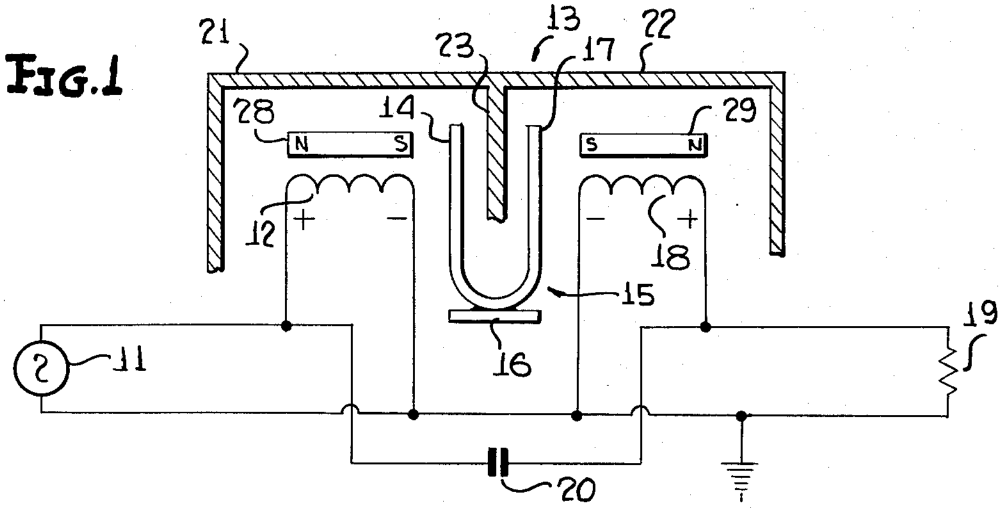
FIGURE 1 is a schematic diagram of a preferred embodiment of the present invention.
Figure 2:
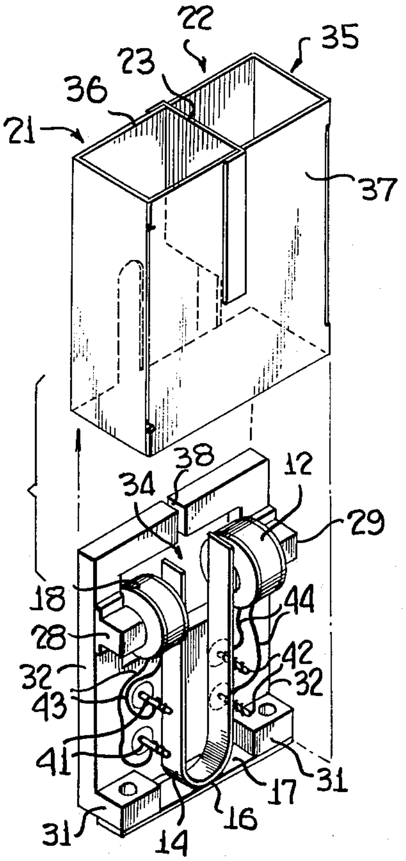
FIGURE 2 is an exploded view illustrating the mechanical construction of a preferred embodiment of the tuning fork assembly.
Figure 3:
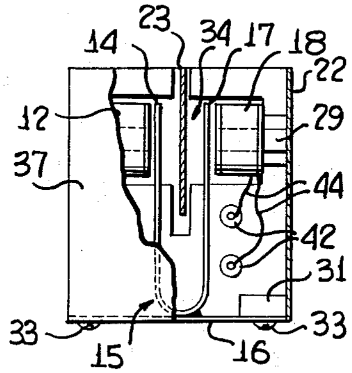
FIGURE 3 is a front view of the tuning fork with the shield plate partially removed.
Figure 4:
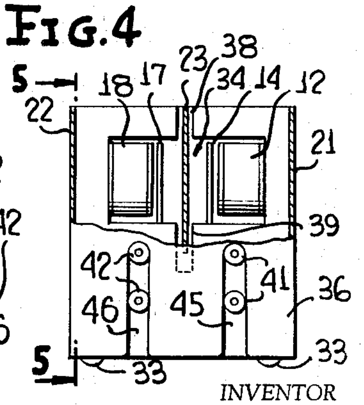
FIGURE 4 is a back view of the tuning fork when it is completely assembled, with a segment of the shield plate removed.
Figure 5:
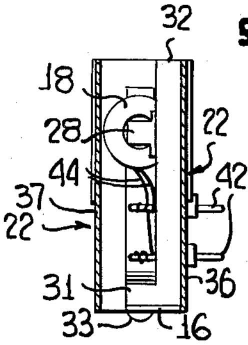
FIGURE 5 is a side sectional view of the tuning fork taken through the lines 5—5 of FIGURE 4.

Reference is now made to FIGURE 1 of the drawings wherein A.C. signal source 11 is selectively coupled through bandpass tuning fork filter assembly 13 to load 19, which in an exemplary case is shown as resistor 19. Filter assembly 13 includes tuning fork 15, mounted on base 16 that carries input or pickup tine 14 as well as output or driven tine 17. Associated with vibratile tines 14 and 17, of highly magnetic permeable material, are separate coil magnet combinations; coil 12 and magnet 28 for tine 14; coil 18 and magnet 29 for tine 17. The coil magnet combinations are arranged such that fork frequency oscillations are derived from the ungrounded end of output coil 18 with the same phase as signals applied to the ungrounded end of input coil 12. This orientation of the drive and pickup coils and magnets results in the reed frequency signal deriving from winding 18 phase lagging by approximately 90° the signal applied to winding 12. The fork frequency signal is phase advanced by approximately 90°. These results are attained by properly winding coils 12 and 18, as well as by arranging the poles of magnets 28 and 29 in magnetic circuits having the correct polarity.

To substantially prevent transformer coupling between input and output coils 12 and 18 for all frequencies of source 11, magnetic shields 21 and 22, having as a common wall plate 23, are provided. Shields 21 and 22 are respectively arranged to surround tines 14 and 17 and the circuitry associated with them. It has been found through experimentation that separate shields around the circuitry associated with the drive and driven tines are necessary to provide the desired degree of magnetic decoupling between coils 12 and 18.

The essence of the present invention resides in connecting capacitor 20 between the ungrounded ends of coils 12 and 18. This capacitor couples voltage from signal source 11 to load 19 such that it substantially cancels the reed frequency energy coupled through fork assembly 13. The value of capacitor 20 for maximum reed frequency response attenuation depends upon the delay or phase lag introduced in transferring energy between coils 12 and 18 via tines 14 and 17.

In describing the operation of fork assembly 13, three conditions will be considered; namely, when the frequency of source 11 is: (1) displaced from both the reed and fork frequencies; (2) coincident with the reed frequency; and (3) coincident with the fork frequency.

Under the first condition, fork assembly 13 including tines 14 and 17 as well as mounting plate 16 remain stationary. Thereby, there is virtually no energy electromechanically coupled between windings 12 and 18. While there is a tendency for inductive coupling between coils 12 and 18, it is almost completely obviated by the magnetic shielding effects of chambers 21 and 22. Electromagnetic decoupling prevails for all three listed conditions because of these chambers.

For relatively low frequencies, there is some coupling through capacitor 20. Capacitive coupling remains substantially constant over the frequency band of interest, however, since it decreases by only 3 db per octave. Since relative, not absolute response, is important, and coupling through the capacitor is so much less than through the excited fork, i.e., than the amount of coupling through the fork at its fork frequency capacitive coupling can generally be ignored.

Attainment of the second condition, where the frequency of source 11 coincides with the assembly reed frequency, causes tines 14 and 17, as well as mounting plate 16, to be set into oscillation as a unit. Thus, the entire assembly rotates together as a reed with tines 14 and 17 both moving together toward coil 12 at one time instant and toward coil 18 at another time instant. As stated supra, such motion of fork assembly 13 results in approximately a 90° phase lag of the voltage induced in coil 18 relative to the voltage applied to winding 12.

Capacitor 20 couples signal from source 11 to load 19 with approximately a 90° phase advance. In consequence, the reed frequency voltage supplied to load 19 by capacitor 20 is out of phase, i.e., of opposite polarity, to the reed frequency voltage coupled to the load by coil 18. The value of capacitor 20 is selected to introduce only enough phase advance in the voltage supplied by it to load 19 to compensate fully for the slightly less than 90° lag effects introduced by the fork assembly and pickup coil 18. Thereby, the voltages supplied to resistor 19 by coil 18 and capacitor 20 are exactly 180° out of phase.

By appropriately attenuating one of the read frequency voltages supplied to load 19 with a resistor (not shown), the reed frequency response can be completely nullified. Actually, complete nullification is not usually necessary, sufficient cancellation being provided by the out of phase voltages directly supplied to load 19 by the coil 18 and capacitor 20.

When the frequency of source 11 coincides with the fork frequency, condition three supra, tines 14 and 17 vibrate in equal and opposite directions while plate 16 remains stationary, i.e., tines 14 and 17 move toward coils 12 and 18 at one time instant while moving toward wall 23 at another time. Thus, the voltage induced in coil 18 for fork oscillation of assembly 13 is 180° out of phase to the voltage induced in the pickup coil during reed oscillation. The fork frequency voltage induced in winding 18 is thereby phase advanced approximately 90° relative to the voltage of source 11, hence is exactly in phase with the voltage coupled through capacitor 20. The inphase voltage components supplied to resistor 19 by coil 18 and capacitor 20 are added together to provide a large amplitude response at the fork frequency.

Reference is now made to FIGURES 2–5 of the drawings wherein the mechanical construction of a typical tuning fork with which the present invention may be utilized is illustrated. Sheet metal fork 15, preferably made from NI SPAN C, is mounted on strip 16 that is secured to feet 31 on metal block 32 by screws 33. Block 32 includes a substantially rectangular cut out area 34 in which cylindrical coils 12 and 18 are positioned. Coils 12 and 18, which have common longitudinal axes, are located at either end of cut out 34. The longitudinal axes of coils 12 and 18 are coincident with the axes of permanent magnets 28 and 29, mounted on block 32 at either end of cut out 34. Coils 12 and 18 have their adjacent faces separated by approximately 0.5 inch so that there is substantial magnetic coupling between them if shields 21 and 22 are not employed.

The shield structure comprises a sheet of highly permeable metal, preferably Mu Metal, that is folded into a right parallelepiped 35 having open vertical ends, so that it can slide over block 32. The interior dimensions of shield body 35, approximately 1⅜" in height, 1¼" in length, and ½" in width, are slightly less than the total dimensions of block 32 and strip 16 so that the shield is maintained in fixed position relative to the block only by frictional forces after it is slid over the block.

Center strip 23, about 1/32" in width, extends approximately 13/16" along the 1⅜" length of the shield body. Strip 23, secured at either of its ends to the opposed faces 36 and 37 of shield body 35, extends between vertical slots 38 and 39 on block 32 when the shield encompasses the block.

Coils 12 and 18 are connected to terminal pairs 41 and 42, by leads 43 and 44, respectively. To enable shield body 35 to encompass the rear of block 32, from which leads 43 and 44, connected to terminal pairs 41 and 42, emanate, vertically extending slots 45 and 46 are provided. Thereby, energy from source 11 excites tine 14 via leads 43 and terminal pair 41; the voltage induced in winding 18 by tine 17 is coupled to load 19 by way of leads 44 as well as terminal set 42.

Capacitor 20 is connected between one terminal of each terminal pair 41 and 42. In one embodiment, the assembly described has a fork frequency of 400 cycles per second and a reed frequency of 395 cycles per second. If capacitor 20 is excluded, the reed frequency response is about 15 db below the fork frequency response. When capacitor 20 is seletced to equal 0.0014 microfarad, the reed frequency response is minimized to approximately 40 db. For each timing fork configuration, the value of capacitor 20 that will provide minimum reed frequency response must be ascertained, preferably on an emperical basis.

While I have described and illustrated one specific embodiment of my invention, it will be clear that variations of the details of construction which are specifically illustrated and described may be resorted to without departing from the true spirit and scope of the invention as defined in the appended claims.

I claim:

1. A tuning fork filter for coupling energy from an input signal source to a load at only a predetermined frequency to the exclusion of all others comprising a tuning fork assembly having a pair of vibratile tines, said tuning fork assembly vibrating at two different frequencies, the vibrations at said frequencies being in different modes, one of said modes being at said predetermined frequency, a transducer responsive to said source for activating one of said tines, a second transducer for deriving an output signal in response to movement of the other tine, the relative polarities of the output signal being reversed for said two modes, means responsive to said second transducer for coupling said output signal to said load, and means responsive to said source for feeding said input signal to said load with a phase opposite to the phase of the signal supplied to the load at the other frequency by said second transducer.

2. The filter of claim 1 wherein said means for feeding comprises a capacitor in series circuit between said input source and load, said fork assembly and transducers introducing a predetermined phase delay at said other frequency, the value of said capacitor being selected to advance the phase of the input signal at said other frequency by the same amount as said phase delay.

3. A tuning fork filter for coupling energy from a source to a load only at the fork frequency to the exclusion of the reed frequency comprising a tuning fork assembly having a fork with first and second magnetic tines, a drive coil coupled to drive said first tine, a pickup coil for driving an output signal in response to movement of said second tine, the polarity of the output signal being reversed at said reed frequency relative to the polarity of the output signal for the fork frequency for like movements of said first tine, means responsive to said pickup coil for coupling said output signal to said load, and means responsive to said source for feeding said input signal to said load with a phase opposite to the phase of the signal supplied to the load at the reed frequency by said pickup coil.

4. The filter of claim 3 wherein said means for feeding comprises a capacitor in series circuit between said input source and load, said fork assembly and coils introducing a predetermined phase delay at said reed frequency, the value of said capacitor being selected to advance the phase of the input signal at said reed frequency by the same amount as said phase delay.

5. The filter of claim 3 further including means for electromagnetically decoupling said first tine and said drive coil from said second tine and said pickup coil.

6. The filter of claim 5 wherein said decoupling means includes first electromagnetic shield means substantially surrounding said first tine and said drive coil and second electromagnetic shield means substantially surrounding said second tine and said pickup coil.

7. A tuning fork filter for coupling energy from a source to a load only at the fork frequency to the exclusion of the reed frequency comprising a tuning fork assembly having a fork including first and second magnetic tines, a drive coil coupled to drive said first tine, a pickup coil for deriving an output signal in response to movement of said second tine, the phase of the output signal at said reed frequency being phase delayed relative to the phase of the signal applied to said drive coil, the phase of the output signal at said fork frequency being phase advanced relative to the phase of the signal applied to said drive coil, and means including a capacitor connected in series circuit between said drive and pickup coils.

8. The filter of claim 7 wherein the value of said capacitor is selected to advance the phase of the reed frequency signal applied across said pickup coil by at least approximately the same amount as said phase delay.

9. The combination according to claim 8, wherein is further included means for electromagnetically decoupling said first tine and said drive coil from said second tine and said pickup coil.

10. A tuning fork filter for coupling energy from a source to a load only at the fork frequency to the exclusion of the reed frequency, comprising a tuning fork assembly having a fork with first and second magnetic tines, a drive coil coupled to drive said first tine, a pickup coil for deriving an output signal in response to movement of said second tine, the phase of the output signal at said reed frequency being phase delayed relative to the phase of the signal applied to said drive coil, the phase of the output signal at said fork frequency being phase advanced relative to the phase of the signal derived by said drive coil, and circuit means coupling said drive coil and pickup coil, said circuit means being arranged to advance the phase of the reed frequency supplied by said circuit to said pickup coil by at least approximately an advance equal to said phase delay.

11. The combination according to claim 10, wherein is further included means for electromagnetically decoupling said first tine and said drive coil from said second tine and said pickup coil.

12. A tuning fork filter for coupling energy from a drive source to a load, comprising a tuning fork, a drive coil coupled to said tuning fork, a pickup coil coupled to said tuning fork, said tuning fork having a natural reed frequency and a natural fork frequency differing substantially from said natural reed frequency, said drive source having substantially the same frequency as said natural fork frequency, said tuning fork electromechanically coupling said drive coil and said pickup coil, and circuit means coupling said drive source directly to said pickup coil, said circuit means being arranged to provide signal to said pickup coil in a phase which is additive in said pickup coil of signal at said fork frequency and subtractive of signal at said reed frequency in respect to signal transferred electromechanically from said drive coil to said pickup coil.

No references cited.

HERMAN KARL SAALBACH, *Primary Examiner*.

L. ALLAHUT, *Assistant Examiner*.